United States Patent [19]

Lee

[11] Patent Number: 5,140,423
[45] Date of Patent: Aug. 18, 1992

[54] APERTURE COMPENSATING CIRCUIT FOR A VIDEO SYSTEM

[75] Inventor: Jung-gang Lee, Kwacheon, Rep. of Korea

[73] Assignee: SamSung Electronics Co., Ltd., Suwon, Rep. of Korea

[21] Appl. No.: 636,214

[22] Filed: Dec. 31, 1990

[30] Foreign Application Priority Data

Dec. 30, 1989 [KR] Rep. of Korea .................. 89-21277

[51] Int. Cl.$^5$ ...................... H04N 5/18; H04N 5/208
[52] U.S. Cl. ................................... 358/162; 358/172
[53] Field of Search ............................. 358/162, 172

[56] References Cited

U.S. PATENT DOCUMENTS

| | | | |
|---|---|---|---|
| 4,110,790 | 8/1978 | Wheeler | 358/172 |
| 4,558,354 | 12/1985 | Tanaka | 358/162 |
| 4,811,101 | 3/1989 | Yagi | 358/172 |
| 4,992,877 | 2/1991 | Takayama | 358/162 |

Primary Examiner—Howard W. Britton
Attorney, Agent, or Firm—Robert E. Bushnell

[57] ABSTRACT

An aperture compensating circuit for enhancing the contour compensating in the picture and S/N ratio is disclosed. The aperture compensating circuit comprises a means for separating the luminance signal from the input signal, sample and hold means for sampling, holding and switching the luminance signal level input to the monitor with two times subcarrier frequency, 2 fs, a first control means for controlling the aperture edge quantity to emphasize the contour signal according to the value of the level output from the sample and hold means, a clamping means between the sample/hold means and a second control means to prevent the unstablization of the luminance signal level due to a distribution level between a source and a gate of the field effect transistor in the sample/hold means by clamping the source stage of said field effect transistor; and a second control means for controlling the aperture edge quantity in such a manner that when the edge quantity is controlled by the first control means, if the level of the luminance signal is high, the edge quantity is to be increased regardless of the difference of the luminance levels within the 1 H period, while if the level of the luminance signal is low, the edge quantity is to be decreased.

4 Claims, 1 Drawing Sheet

APERTURE COMPENSATING CIRCUIT FOR A VIDEO SYSTEM

FIELD OF THE INVENTION

The present invention relates to an aperture edge control circuit for emphasizing the contour signal on the video signal in the video system, and more particularly to an aperture compensating circuit for compensating the contour of the picture and for improving S/N ratio by controlling the aperture edge quantity according to the level of luminance signal.

BACKGROUND OF THE INVENTION

Generally, in the video apparatus such as a color television or a video camera, since the spot of the electron beam in cathode ray tube or camera tube has a limited size, a so-called aperture distortion can be generated, so that the horizontal or vertical resolution is lowered in the high frequency region of the picture.

An example of the conventional aperture compensating circuit to eliminate such an aperture distortion is illustrated in FIG. 1.

The aperture compensating circuit as illustrated in FIG. 1 comprises a differential amplifying circuit having transistors Q1, Q2, bias resistors R1 to R5, a delay line DL provided between collectors of said transistors Q1 and Q2, and a variable resistor VR1 connected to the emitter of the said transistors Q1 and Q2 to preset the aperture edge quantity.

However, in the conventional circuit comprised as above, the aperture edge quantity is large in case that the level difference of the adjacent luminance signals is large, and is small in case that the level difference of luminance signals is small. Therefore, even if the average value of luminance signal level is high, when the level difference is small, only the small edge quantity is added to the luminance signal.

As a result, the desirable compensating effect can not be attained and S/N ratio is lowered, thereby deteriorating the image quality.

SUMMARY OF THE INVENTION

The present invention has been developed to remove the above-mentioned drawbacks in the conventional aperture edge compensating circuit.

Therefore, it is an object of the present invention to provide an aperture compensating circuit in which the aperture compensation can be accurately performed when the level of the luminance signal is high.

It is another object of the present invention to provide an aperture compensating circuit for enhancing the S/N ratio when the level of the luminance signal is low.

In accordance with the present invention, there is provided an aperture compensating circuit comprising a means for separating the luminance signal from the input signal, sample and hold means for sampling, holding and switching the luminance signal level input to the monitor with two times subcarrier frequency, 2 fs, a first control means for controlling the aperture edge quantity to emphasize the contour signal according to the value of the level outputted the sample and hold means, a clamping means between the sample/hold means and a second control means to prevent the unstablization of the luminance signal level due to a distribution level between a source and a gate of the field effect transistor in the sample/hold means by clamping the source stage of said field effect transistor; and a second control means for controlling the aperture edge quantity in such a manner that when the edge quantity is controlled by the first control means, if the level of the luminance signal is high, the edge quantity is to be increased regardless of the difference of the luminance levels within the 1 H period, while if the level of the luminance signal is low, the edge quantity is to be decreased.

BRIEF DESCRIPTION OF THE DRAWINGS

The objects and features of the present invention will become more readily apparent from the following detailed description of the preferred embodiment taken in conjunction with the accompanying drawings in which.

DETAILED DESCRIPTION OF THE INVENTION

Figure 1:
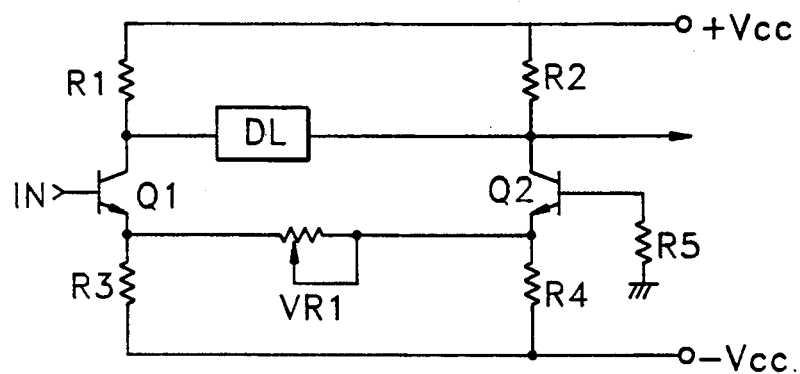
FIG. 1 is a circuit diagram showing a conventional aperture compensating circuit.
Figure 2:
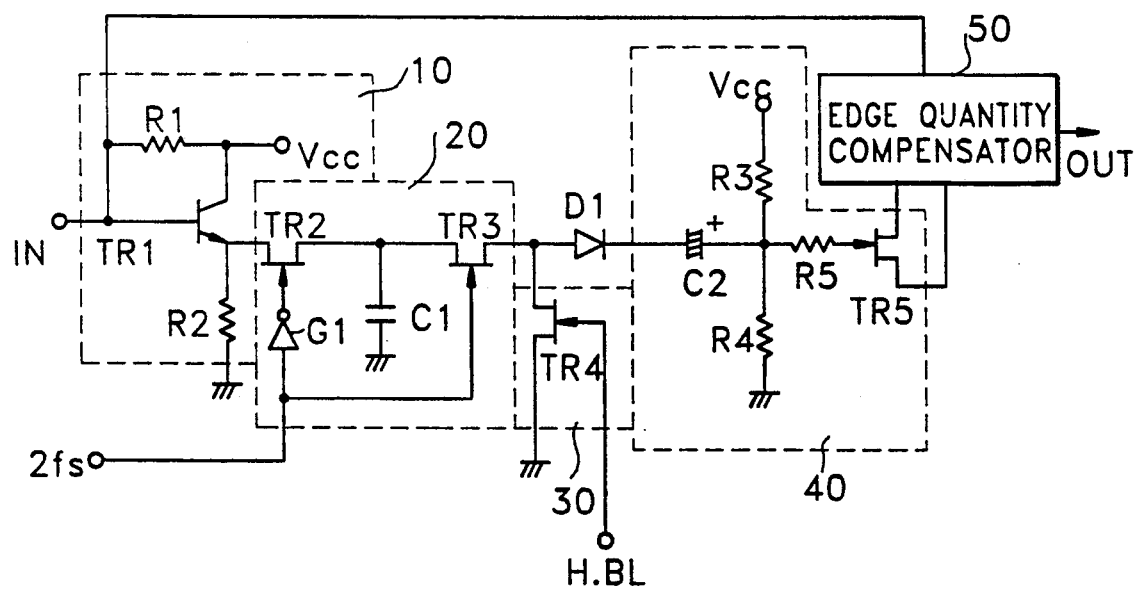
FIG. 2 is a circuit diagram showing a aperture compensating circuit according to a preferred embodiment of the present invention.

A preferred embodiment of the aperture compensating circuit according to the present invention is illustrated of FIG. 2.

In FIG. 2, the input luminance signal separating circuit 10 comprises a buffer transistor TR1, and a bias resistor R1 and emitter follower output resistor R2 of the transistor TR1.

The sample and hold means 20 comprises two field effect transistors TR2 and TR3, a condenser C1 for a time constant and inverter G1, to sample, hold and switch the luminance signal output from the luminance signal separator 10 by the clock frequency with a doubled oscillating frequency.

The clamping circuit 30 is composed of a field effect transistor TR4.

The field effect transistor TR4 constituting the clamping circuit 30 is operated by 1H horizontal blanking pulse HBL to clamp the source of transistor TR3 to the ground, so that unstablization of DC level due to the distribution capacitance between source and gate of transistor TR3 is prevented.

The control device 40 comprises a field effect transistor which serves as the voltage-controlled resistance element, a plurality of resistors R3 to R5, and a coupling condenser C2, to control the edge compensating quantity of the edge quantity compensator 50 according to the DC level output from the sample and hold means 20.

The operation of the aperture compensating circuit having the above-mentioned construction will be described below.

With a clock frequency of the doubled oscillating frequency 2 fs fed to the sampling and hold means 20, the luminance signal Y input to the monitor of the video system is fed to the edge quantity compensator 50 and the luminance signal separating means 10.

The luminance signal Y fed to the luminance signal separating means 10 is fed to the drain of the field effect transistor TR2 in the sample and hold portion 20 through the emitter of the buffer transistor TR1.

The field effect transistor TR2, which is operated by the output of the inverter G1 for inverting the doubled frequency 2 fs, samples the luminance signal Y and holds it by the condenser C1. At this time, the time constant for charge of the condenser C1 is based on Ron x C, where, Ron is the turn-on resistance of the transistor TR2, and C is the capacitance of the condenser C1.

According, it is preferable that the turn-on resistance of the transistor TR2 is sufficiently small.

Generally, according to the sampling theory, since the luminance variation which is capable of realization by eye of human up to 2.8 MHz, the sampling frequency in the present invention uses the sampling frequency for example, 7.19 MHz, which is greater than the oscillating frequency fs of 2.8 MHz.

The luminance signal which is sampled by the sampling frequency and held by the condenser C1 during the low period of the clock frequency allows the transistor TR3 to be turned on during the high period of the clock frequency, and then the resultant signal is applied to the field effect transistor TR5 through the diode D1 and the condenser C2.

Here, since the field effect transistor TR5 serves as the voltage-controlled resistance element, if the value of the luminance level is increased, the resistance value thereof is decreased regardless of the level difference between the adjacent luminance signals, while if the value is decreased, the resistance value is increased.

As a result, also in the aperture compensating quantity added to the luminance signal which is fed to the edge quantity compensating portion 50, if the luminance level is high, the edge compensating quantity becomes larger, while if the luminance level is low, it becomes smaller.

That is, the transistor TR5 has a characteristic that the resistance value between the drain and source thereof is linearly varied based on the voltage applied to the gate thereof.

In the meanwhile, since the field effect transistor TR4 constituting the clamping portion 40 is switched by the blanking pulse HBL supplied to the monitor every 1H period, the source stage of the transistor TR3 is to be connected to the ground stage only during the blanking period, thereby clamping the luminance signal.

Therefore, unstablization of the signal level due to the distribution capacitance between the source and the gate of the transistor TR3 can be prevented.

Also, diode D1 is to prevent the surge in the beginning point by counter-biased during said clamping period.

The present invention is not limited to the embodiment described above, it will be understood by one of ordinary skill in the art that various modifications can be made without departing from the spirit and scope of the invention.

What is claimed is:

1. An aperture compensating circuit comprising:
   means for separating a luminance signal from an input signal;
   sample/hold means for sampling, holding and switching said luminance signal to a monitor with an intermediate signal having two times a subcarrier frequency (2 fs) of said luminance signal.
   first control means for controlling an aperture edge quantity to emphasize a contour signal according to the value of an amplitude level output from said sample/hold means, and
   clamping means between said sample/hold means and a second control means to prevent the unstablization of a luminance signal amplitude level due to a distribution level between a source and a gate of a field effect transistor in said sample/hold means by clamping the source stage of said field effect transistor;
   second control means for controlling said aperture edge quantity controlled at said first control means so that if said amplitude level of said luminance signal is high, said aperture edge quantity is to be increased regardless of a difference of the luminance amplitude levels within 1H period, while if said amplitude level of the luminance signal is low, said aperture edge quantity is to be decreased.

2. An aperture compensating circuit as claimed in claim 1, wherein said sample/hold means comprises an inverter for inverting the clock frequency, a field effect for switching and a condenser for setting the time constant.

3. An aperture compensating circuit as claimed in claim 1, wherein said clamping means is composed of a field effect transistor.

4. An aperture compensating circuit as claimed in claim 1, wherein said second control means comprises a field effect transistor for serving a voltage controlled resistance element.

* * * * *

UNITED STATES PATENT AND TRADEMARK OFFICE
CERTIFICATE OF CORRECTION

PATENT NO. : 5,140,423
DATED : 18 August 1992
INVENTOR(S) : Jung-gang LEE

It is certified that error appears in the above-identified patent and that said Letters Patent is hereby corrected as shown below:

Claim 1, Column 4, Line 13, change the period "." to a --,--;

Line 17, change ", and" to --;--;

Line 19, delete "a";

Line 24, insert --and-- after ";"; and

Line 29, change "of" (2nd occ.) to --in--.

Claim 3, Column 4, Line 39, change "is composed of" to --comprises--.

Signed and Sealed this

Seventh Day of September, 1993

*Attest:*

BRUCE LEHMAN

*Attesting Officer*  *Commissioner of Patents and Trademarks*